(12) United States Patent
Ohtsubo

(10) Patent No.: US 11,404,085 B1
(45) Date of Patent: Aug. 2, 2022

(54) MAGNETIC DISK DEVICE AND ERROR CORRECTION PROCESSING METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Jun Ohtsubo, Odawara Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/399,524

(22) Filed: Aug. 11, 2021

(30) Foreign Application Priority Data

Mar. 9, 2021 (JP) .............................. JP2021-037475

(51) Int. Cl.
*G11B 20/12* (2006.01)
*G11B 20/18* (2006.01)
*G11B 5/012* (2006.01)

(52) U.S. Cl.
CPC .............. *G11B 20/18* (2013.01); *G11B 5/012* (2013.01)

(58) Field of Classification Search
CPC .............. G11B 20/1809; G11B 7/4756; G11B 20/1833; G11B 5/012; G11B 20/14; G11B 20/1419; G11B 20/10212; G11B 20/12; G11B 20/18; G06F 11/1072; G06F 3/064; G06F 3/0619; G06F 3/0679; G06F 3/0688
USPC .................................. 360/40, 44, 45, 48, 53
See application file for complete search history.

(56) References Cited

U.S. PATENT DOCUMENTS

| | | | |
|---|---|---|---|
| 8,589,725 | B2 | 11/2013 | Takada et al. |
| 9,007,707 | B1 | 4/2015 | Lu et al. |
| 9,059,737 | B2 | 6/2015 | Coker et al. |
| 9,443,551 | B1 | 9/2016 | Varnica et al. |
| 10,606,699 | B2 * | 3/2020 | Oboukhov ......... G11B 5/59616 |

* cited by examiner

*Primary Examiner* — Nabil Z Hindi
(74) *Attorney, Agent, or Firm* — Kim & Stewart LLP

(57) ABSTRACT

According to one embodiment, a magnetic disk device includes a disk including a first track including a first parity sector and a second track including a second parity sector, a head that writes data to the disk and reads data from the disk, and a controller that writes, to the first parity sector, a third parity sector obtained by XORing a first sector group included in each of the first track and the second track, and writes, to the second parity sector, a fourth parity sector obtained by XORing a second sector group different from the first sector group, included in each of the first track and the second track.

20 Claims, 12 Drawing Sheets

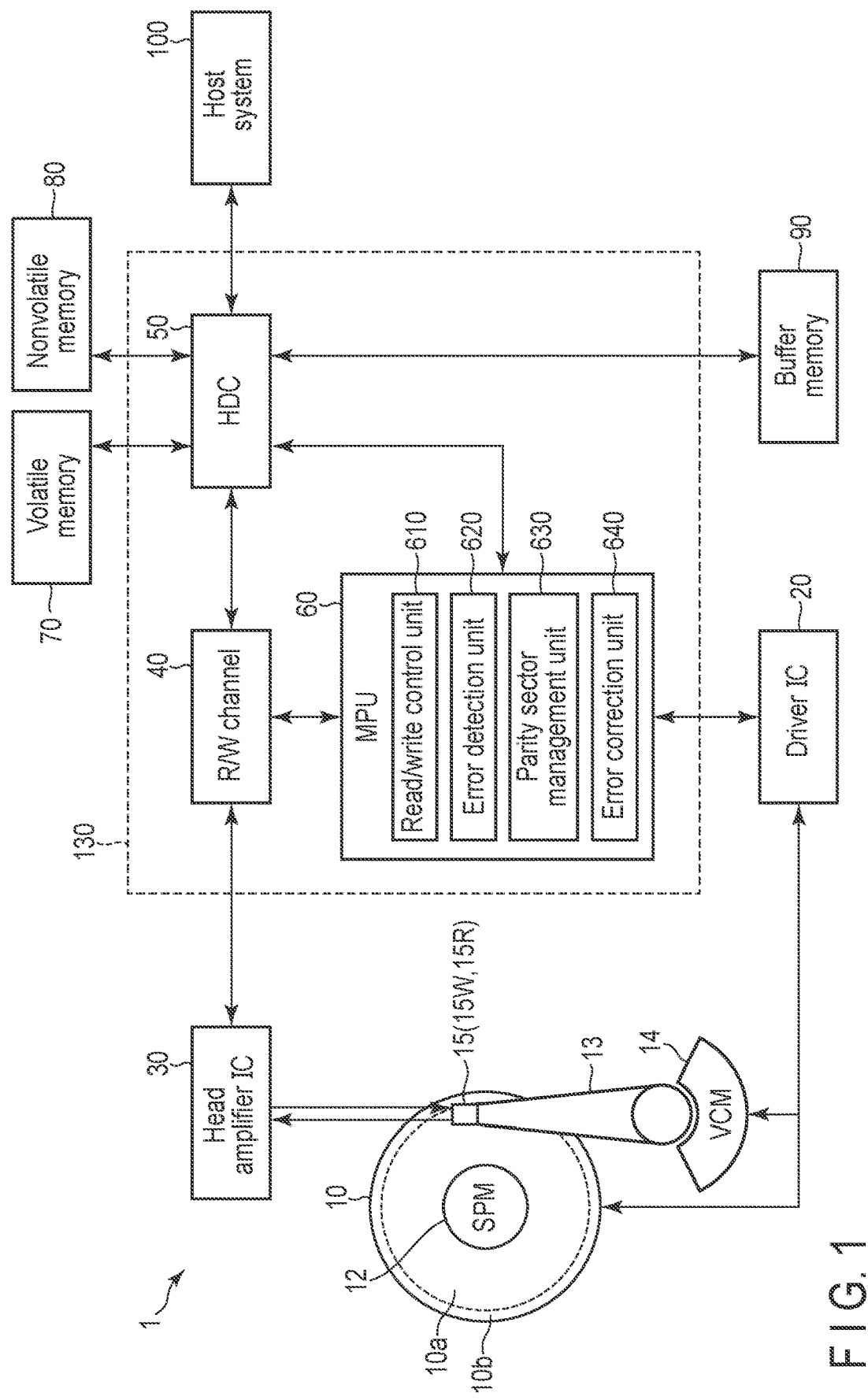
F I G. 1

|     |         |         |         |         |         |         |     |              |              |         |       |
|-----|---------|---------|---------|---------|---------|---------|-----|--------------|--------------|---------|-------|
| Tr1 | Sc1-1   | Sc2-2   | Sc3-3   | Sc1-4   | Sc2-5   | Sc3-6   | ... | Sc1-(n-2)    | Sc2-(n-1)    | Sc3-n   | P1-1  |
| Tr2 | Sc1-2   | Sc2-3   | Sc3-4   | Sc1-5   | Sc2-6   | Sc3-7   | ... | Sc1-(n-1)    | Sc2-n        | Sc3-1   | P2-1  |
| Tr3 | Sc1-3   | Sc2-4   | Sc3-5   | Sc1-6   | Sc2-7   | Sc3-8   | ... | Sc1-n        | Sc2-1        | Sc3-2   | P3-1  |

| Group number | Head number | Start track number | Target track count |
|---|---|---|---|
| 1 | 2 | 3000 | 1 |
| 2 | 2 | 3001 | 1 |
| 3 | 2 | 3002 | 1 |
| 4 | 4 | 1333581 | 1 |
| 5 | 3 | 30950 | 1 |
| ⋮ | ⋮ | ⋮ | ⋮ |

FIG. 10

| Group number | Head number | Start track number | Target track count |
|---|---|---|---|
| 1 | 2 | 3000 | 3 |
| 2 | | | |
| 3 | | | |
| 4 | 4 | 1333581 | 1 |
| 5 | 3 | 30950 | 1 |
| ⋮ | ⋮ | ⋮ | ⋮ |

FIG. 11

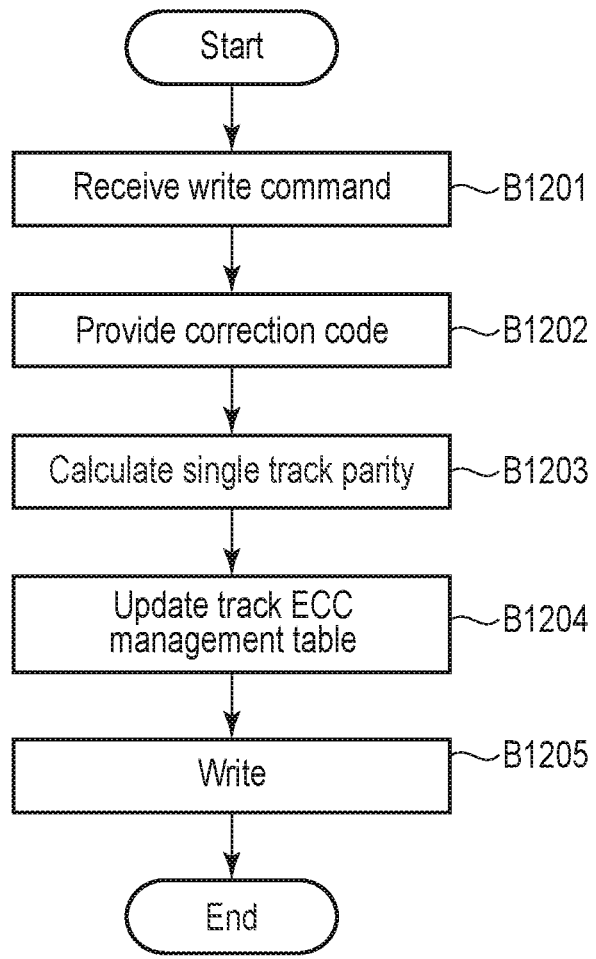
F I G. 12

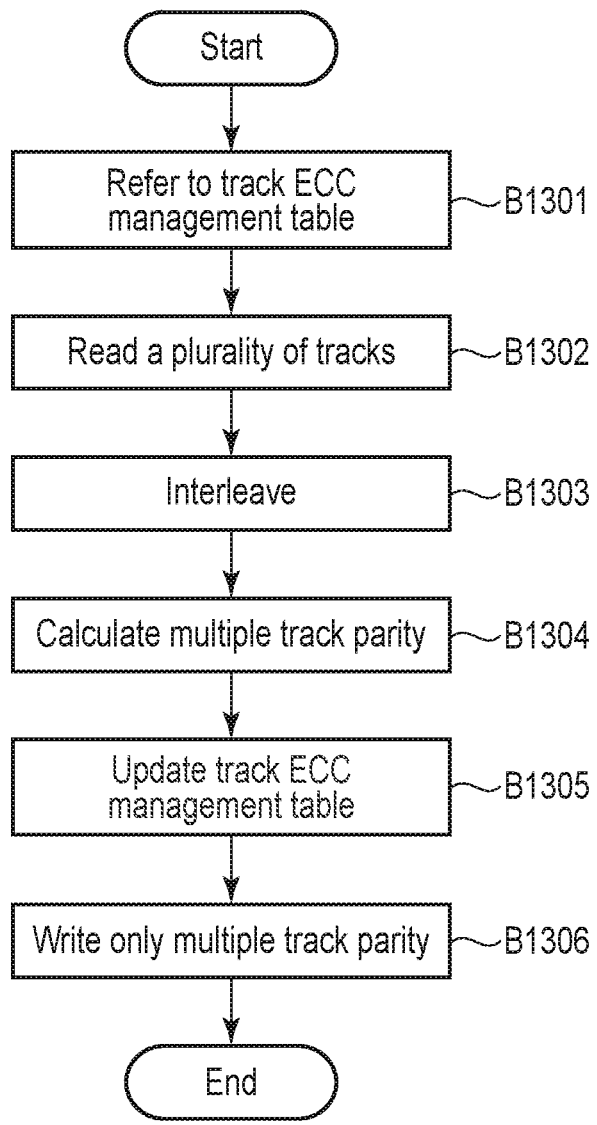
F I G. 13

MAGNETIC DISK DEVICE AND ERROR CORRECTION PROCESSING METHOD

CROSS-REFERENCE TO RELATED APPLICATIONS

This application is based upon and claims the benefit of priority from Japanese Patent Application No. 2021-037475, filed Mar. 9, 2021, the entire contents of which are incorporated herein by reference.

FIELD

Embodiments described herein relate generally to a magnetic disk device and an error correction processing method.

BACKGROUND

The magnetic disk device has a track including a parity sector obtained exclusively ORing (XORing) sectors. When an error is detected in a particular sector of the track, the magnetic disk device executes an error correction processing (hereinafter, may be referred to as track ECC processing) for correcting the error using an error correction code based on a parity sector corresponding to the track.

BRIEF DESCRIPTION OF THE DRAWINGS

FIG. 1 is a block diagram illustrating a configuration of a magnetic disk device according to an embodiment.

FIG. 10 is a schematic diagram illustrating an example of a track ECC management table according to the embodiment.

FIG. 11 is a schematic diagram illustrating an example of a track ECC management table according to the embodiment.

FIG. 12 is a flowchart illustrating an example of a method of writing a single track parity according to the embodiment.

FIG. 13 is a flowchart illustrating an example of a method of writing a multiple track parity according to the embodiment.

DETAILED DESCRIPTION

Figure 2:
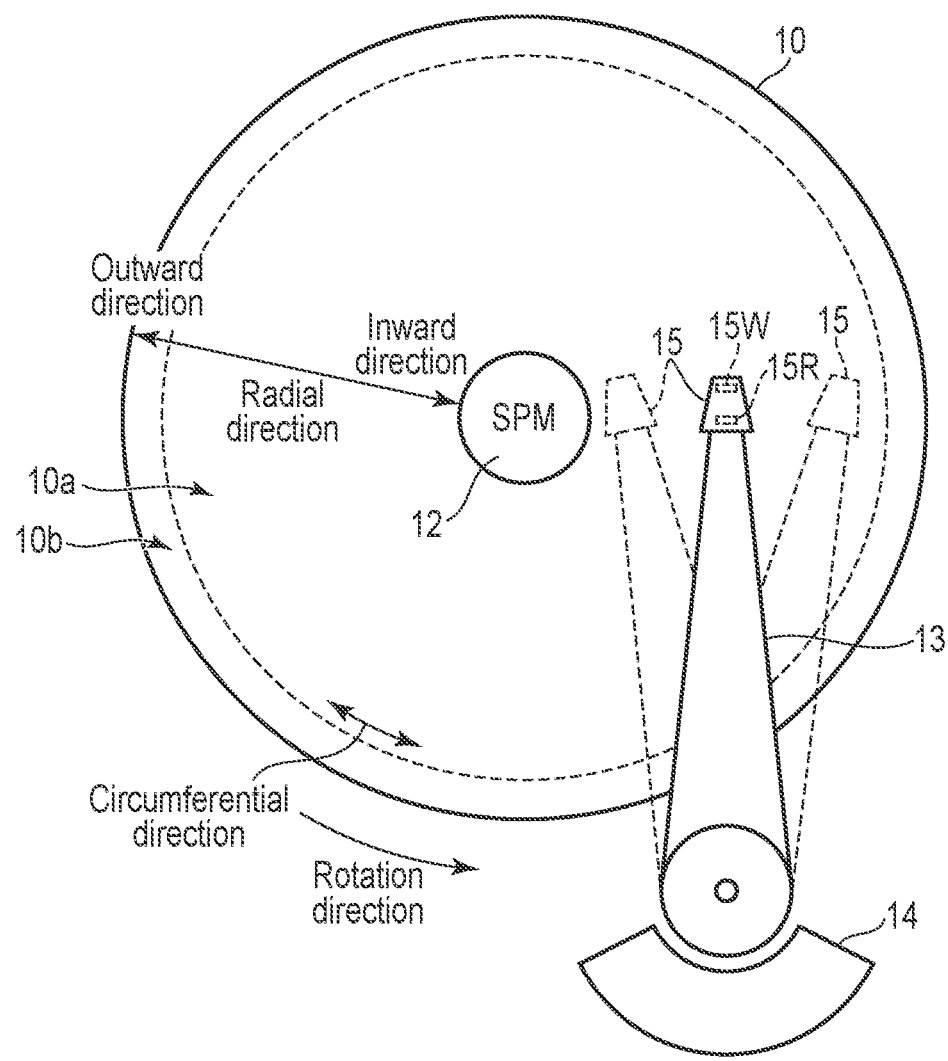
FIG. 2 is a schematic diagram illustrating an example of an arrangement of a head with respect to a disk according to an embodiment.

In general, according to one embodiment, a magnetic disk device comprises: a disk including a first track including a first parity sector and a second track including a second parity sector; a head that writes data to the disk and reads data from the disk; and a controller that writes, to the first parity sector, a third parity sector obtained by XORing a first sector group included in each of the first track and the second track, and writes, to the second parity sector, a fourth parity sector obtained by XORing a second sector group different from the first sector group, included in each of the first track and the second track.

Hereinafter, embodiments will be described with reference to the drawings. The drawings are merely examples, and do not limit the scope of the invention.

Embodiment

FIG. 1 is a block diagram illustrating a configuration of a magnetic disk device 1 according to an embodiment.

The magnetic disk device 1 includes a head disk assembly (HDA), a driver IC 20, a head amplifier integrated circuit (hereinafter, may be referred to as a head amplifier IC or a preamplifier) 30, a volatile memory 70, a nonvolatile memory 80, a buffer memory (buffer) 90, and a system controller 130 which is a one-chip integrated circuit, described later. In addition, the magnetic disk device 1 is connected to a host system (host) 100.

The HDA includes a magnetic disk (hereinafter, referred to as a disk) 10, a spindle motor (SPM) 12, an arm 13 on which a head 15 is mounted, and a voice coil motor (VCM) 14. The disk 10 is attached to the spindle motor 12 and rotates when the spindle motor 12 is driven. The arm 13 and the VCM 14 form an actuator. The actuator controls movement of the head 15, mounted on the arm 13, to a particular position of the disk 10, when the VCM 14 is driven. The number of the disks 10 and the heads 15 provided may be two or more.

The disk 10 has a data writable region allocated with a user data region 10a usable by a user and a system area 10b in which information necessary for system management is recorded. Note that a media cache (may be referred to as a media cache region) that temporarily holds data (or a command) transferred from the host 100 or the like before the data is written to a particular region of the user data region 10a may be allocated in the disk 10, as a region different from the user data region 10a and the system area 10b. Hereinafter, a direction from the inner circumference toward the outer circumference of the disk 10 or a direction from the outer circumference to the inner circumference of the disk 10 is referred to as a radial direction. In the radial direction, a direction from the inner circumference to the outer circumference is referred to as an outward direction (or outer side), and a direction from the outer circumference to the inner circumference, that is, a direction opposite to the outer direction is referred to as an inward direction (inner side). A direction orthogonal in the radial direction of the disk 10 is referred to as a circumferential direction. That is, the circumferential direction corresponds to a direction along the circumference of the disk 10. In addition, a particular position in the radial direction of the disk 10 may be referred to as a radial position, and a particular position in the circumferential direction of the disk 10 may be referred to as a circumferential position. The radial position and the circumferential position may be collectively referred to simply as a position. The disk 10 is divided into a plurality of regions (hereinafter, may be referred to as zone or a zone region) for respective particular ranges in the radial direction. In a zone, data may be written to each particular range in the radial direction. In other words, multiple tracks may be written to the zone. In a track, data may be written to each particular range in the circumferential direction. In other words, the track includes a plurality of sectors. Note that the "track" is used for various meanings including: one of a plurality of regions as a result of dividing the disk 10 into particular ranges in the radial direction; a path of the head 15 at a particular radial position of the disk 10; data extending in the circumferential direction of the disk 10 in the particular radial direction; data of a single cycle written to a particular track of the disk 10; data written to a particular track of the disk 10; and the like. A "sector" is used for various meanings including: one of a plurality of regions as a result of dividing a particular track of the disk 10 in the circumferential direction; data written to a particular circumferential position at a particular radial position of the disk 10; data written to a particular sector of the disk 10; and the like. A "width of a track in the radial direction" may also be referred to as "track width". A "width of a sector in the radial direction" may also be referred to as "sector width".

The head 15 has a slider serving as a main body and includes a write head 15W and a read head 15R mounted on the slider. The write head 15W writes data on the disk 10. For example, the write head 15W performs writing on a particular track to the disk 10. The read head 15R reads data recorded on the disk 10. For example, the read head 15R reads a particular track of the disk 10.

FIG. 2 is a schematic diagram illustrating an example of the arrangement of the head 15 with respect to the disk 10 according to the present embodiment. As illustrated in FIG. 2, in the circumferential direction, a direction in which the disk 10 rotates is referred to as a rotation direction. In the example illustrated in FIG. 2, the rotation direction is illustrated to be the counterclockwise direction, but may be in the opposite direction (clockwise direction).

As illustrated in FIG. 2, driving of the VCM 14 causes the head 15 to rotate about the rotation axis with respect to the disk 10, and the head 15 moves from the inner side toward the outer side to a particular position, or the head 15 moves from the outer side toward the inner side.

In the example illustrated in FIG. 2, in the disk 10, the system area 10b is arranged in the outward direction of the user data region 10a. In the example illustrated in FIG. 2, system area 10b is disposed on the outermost circumference of the disk 10. Note that the system area 10b may be arranged at a position different from the position illustrated in FIG. 2.

The driver IC 20 controls the driving of the SPM 12 and the VCM 14 according to the control of the system controller 130 (specifically, an MPU 60 described later).

The head amplifier IC (preamplifier) 30 includes a read amplifier and a write driver. The read amplifier amplifies a read signal read from the disk 10 and outputs the amplified read signal to the system controller 130 (specifically, a read/write (R/W) channel 40 described later). The write driver outputs, to the head 15, a write current corresponding to write data from the R/W channel 40.

The volatile memory 70 is a semiconductor memory in which stored data is lost when power supply is cut off. The volatile memory 70 stores data and the like necessary for processing in each unit of the magnetic disk device 1. The volatile memory 70 is, for example, a dynamic random access memory (DRAM) or a synchronous dynamic random access memory (SDRAM).

The nonvolatile memory 80 is a semiconductor memory that records stored data even when power supply is cut off. The nonvolatile memory 80 is, for example, a NOR type or NAND type flash read only memory (FROM).

The buffer memory 90 is a semiconductor memory that temporarily records data and the like transmitted and received between the magnetic disk device 1 and the host 100. Note that the buffer memory 90 may be integrated with the volatile memory 70. The buffer memory 90 is, for example, a DRAM, a static random access memory (SRAM), an SDRAM, a ferroelectric random access memory (FeRAM), a magnetoresistive random access memory (MRAM), or the like.

The system controller (controller) 130 is realized by, for example, using a large scale integrated circuit (LSI) called a system-on-a-chip (SoC) in which a plurality of elements are integrated on a single chip. The system controller 130 includes the read/write (R/W) channel 40, a hard disk controller (HDC) 50, the microprocessor (MPU) 60, and the like. The R/W channel 40, the HDC 50, and the MPU 60 are electrically connected to each other. The system controller 130 is electrically connected to, for example, the driver IC 20, the head amplifier IC 30, the volatile memory 70, the nonvolatile memory 80, the buffer memory 90, the host system 100, and the like.

The R/W channel 40 performs signal processing on data (hereinafter, may be referred to as read data) transferred from the disk 10 to the host 100 and on data (hereinafter, may be referred to as write data) transferred from the host 100, in response to an instruction from the MPU 60 described later. The R/W channel 40 has a circuit or a function to demodulate write data. The R/W channel 40 has a circuit or function that measures and demodulates the signal quality of the read data. The R/W channel 40 is electrically connected to, for example, the head amplifier IC 30, the HDC 50, the MPU 60, and the like.

The HDC 50 controls data transfer. For example, the HDC 50 controls data transfer between the host 100 and the disk 10 according to an instruction from the MPU 60 to be described later. The HDC 50 is electrically connected to, for example, the R/W channel 40, the MPU 60, the volatile memory 70, the nonvolatile memory 80, the buffer memory 90, and the like.

The MPU 60 is a main controller that controls each unit of the magnetic disk device 1. The MPU 60 controls the VCM 14 through the driver IC 20 and performs servo control for positioning the head 15. The MPU 60 controls the SPM 12 through the driver IC 20 and rotates the disk 10. The MPU 60 controls the operation of writing data to the disk 10 and selects the storage destination of data transferred from the host 100 which is, for example, the write data. In addition, the MPU 60 controls the operation of reading data from the disk 10 and controls the processing of data transferred from the disk 10 to the host 100. The MPU 60 manages a region for recording data. The MPU 60 is connected to each unit of the magnetic disk device 1. The MPU 60 is electrically connected to, for example, the driver IC 20, the R/W channel 40, the HDC 50, and the like.

The MPU 60 includes a read/write control unit 610, an error detection unit 620, a parity sector management unit 630, and an error correction unit 640. The MPU 60 executes processing of these units which are, for example, the read/write control unit 610, the error detection unit 620, the parity sector management unit 630, the error correction unit 640, and the like. The MPU 60 may include these units in a form of a circuit. In addition, the read/write control unit 610, the error detection unit 620, the parity sector management unit 630, and the error correction unit 640 may be provided in each of the R/W channel 40 or the HDC 50.

The read/write control unit 610 controls read processing of reading data from the disk 10 and write processing of writing data to the disk 10 according to a command from the host 100 or the like. The read/write control unit 610 controls the VCM 14 via the driver IC 20, seeks the head 15 to position the head 15 at a particular position on the disk 10, and performs read processing or write processing. The read/write control unit 610 positions the head 15 at a particular radial position and writes data in a particular region. Upon receiving a write command from the host 100 or the like, the read/write control unit 610 writes, to each sector, data to which a correction code (or an error correction code (ECC)) is added. The read/write control unit 610 positions the head 15 at a particular radial position and reads data from a particular region. Upon receiving a read command from the host 100 or the like, the read/write control unit 610 reads data written to a particular track or a particular sector. The term "access" includes meanings such as recording or writing data (or write processing) in a particular region, reading out or reading (or read processing) data from a particular region, and moving the head 15 or the like to a particular region of the disk 10. Furthermore, "positioning or arranging the center portion of the head 15 (the write head 15W or the read head 15R) at a particular position" may be simply expressed as "positioning or arranging the head 15 (the write head 15W or the read head 15R) at a particular position".

Note that the read/write control unit 610 may write data under a shingled recording (Shingled Write Magnetic Recording (SMR) or Shingled Write Recording (SWR)) mode in which a track to be written next is overwritten on a part of a particular track in the radial direction, or may write data under a conventional recording (conventional magnetic recording (CMR)) mode in which a track (hereinafter, the track may be referred to as an adjacent track) adjacent to the particular track in the radial direction or a sector (hereinafter, may be referred to as an adjacent sector) adjacent to the particular track in the radial direction is written at a particular interval in the radial direction from the particular track or the particular sector. This "adjacent" of course includes a case where data pieces, objects, regions, spaces, and the like are arranged side by side while being in contact with each other, but also includes a case where these are arranged with particular gaps in between. The "adjacent track" includes a "track adjacent to the particular track in the outward direction", a "track adjacent to the particular track in the inward direction", and a "plurality of tracks adjacent to the particular track in the outward direction and in the inward direction of". The "adjacent sector" includes a "sector adjacent to the particular sector in the outward direction", a "sector adjacent to the particular sector in the inward direction", and a "plurality of sectors adjacent to the particular sector in the outward direction and the inward direction". Furthermore, "writing data under the shingled recording mode" may be referred to as "shingled recording", "performing shingled recording processing", or simply "writing". Furthermore, "writing data under the conventional recording mode" may be referred to as "conventional recording", "performing conventional recording processing", or simply "writing".

The error detection unit 620 detects data, a sector, a region, and the like in which an error has occurred. The error detection unit 620 detects unreadable data (hereinafter, may be referred to as read error data or error data) or unreadable sectors (hereinafter, may be referred to as a read error sector or an error sector). The error detection unit 620 detects read error sector or the read error data written to the read error sector based on a detection (inspection) code. For example, the error detection unit 620 detects the read error sector of the particular track or the read error data written to the read error sector of the particular track based on a parity inspection code.

The parity sector management unit 630 calculates a parity sector (or parity data) by exclusively ORing (XORing) data of a particular region, and writes the calculated parity sector (or parity data) in a particular area of the disk 10. The parity sector management unit 630 may record areas the errors in which can be corrected (recover or remediation) through error correction processing (hereinafter, maybe referred to as track ECC processing, track ECC, or error correction processing) of correcting an error by an ECC (hereinafter, may be referred to as track ECC) corresponding to a particular track based on a particular parity sector, in a form of a table (hereinafter, may be referred to as a track ECC management table), in a particular recording region, for example, the disk 10, the volatile memory 70, the nonvolatile memory 80, the buffer memory 90, or the like.

The parity sector management unit 630 XORs all sectors (for example, other than the error sector and the parity sector) of a particular track to calculate a parity sector (hereinafter, may be referred to as single track parity), and writes the calculated parity sector into this track. Note that the parity sector management unit 630 may XOR some of sectors (for example, other than error sectors) of a particular track to calculate the parity sector and write the calculated parity sector in this track. The parity sector management unit 630 records information on a particular track corresponding to the parity sector and information on some sectors of the particular track in a form of the track ECC management table in a particular recording region such as, for example, the disk 10, the volatile memory 70, the nonvolatile memory 80, or the buffer memory 90.

The parity sector management unit 630 XORs a part of sectors (for example, other than the error sector and the parity sector) of a plurality of tracks to calculate parity sectors (hereinafter, may be referred to as multiple track parity), and writes the calculated parity sector into one of these tracks. For example, the parity sector management unit 630 XORs a plurality of sectors (for example, other than the error sector and the parity sector) included in each of a plurality of tracks to calculate parity sectors (hereinafter, may be referred to as multiple track parity), and writes the calculated parity sector into one of these tracks. The parity sector management unit 630 may XOR all sectors (for example, other than the error sector and the parity sector) of a plurality of tracks to calculate a parity sector, and write the calculated parity sector to at least one track of these tracks. The parity sector management unit 630 records information on a part of sectors of a plurality of tracks, and information on the particular track in a form of the track ECC management table in a particular recording region such as, for example, the disk 10, the volatile memory 70, the nonvolatile memory 80, or the buffer memory 90.

For example, upon receiving a write command from the host 100 or the like and writing a particular track according to the write command, the parity sector management unit 630 calculates a single track parity by XORing each sector of the track and performs writing on the calculated single track parity in a particular sector of the track. The parity sector management unit 630 records the information of the track corresponding to the single track parity in a particular recording region, for example, the disk 10, the volatile memory 70, the nonvolatile memory 80, the buffer memory 90, or the like as a track ECC management table.

For example, when there is extra processing capability of the magnetic disk device 1 to spare, there is extra time to spare, or when the magnetic disk device 1 is in the idle state for example and is not operating, for example, the parity sector management unit 630 regularly (or discontinuously) selects some sectors in a plurality of tracks to be a target, and interleaves (or may be referred to as interleave parity encoding) (transmits and/or rearranges) selected some sectors regularly (or discontinuously) in the plurality of tracks read in a particular recording region which is, for example, in the disk 10, the volatile memory 70, the nonvolatile memory 80, the buffer memory 90, or the like. Note that the parity sector management unit 630 in the idle state may randomly (or continuously) select some sectors in a plurality of target tracks, for example, and interleave some sectors randomly (or continuously) selected in a plurality of tracks read in a particular recording region such as, for example, the disk 10, the volatile memory 70, the nonvolatile memory 80, or the buffer memory 90. The parity sector management unit 630 calculates multiple track parities by XORing some sectors regularly (or discontinuously) selected in a plurality of tracks in a particular recording region such as, for example, the disk 10, the volatile memory 70, the nonvolatile memory 80, or the buffer memory 90, and writes (or overwrites) the calculated multiple track parities to the single track parity of one track of these tracks. The parity sector management unit 630 records the information of the track corresponding to the multiple track parities in a particular recording region, for example, the disk 10, the volatile memory 70, the nonvolatile memory 80, the buffer memory 90, or the like as a track ECC management table. The parity sector management unit 630 may calculate multiple track parities by XORing some sectors randomly (or continuously) selected in a plurality of tracks in a particular recording region such as, for example, the disk 10, the volatile memory 70, the nonvolatile memory 80, or the buffer memory 90, and write (or overwrite) the calculated multiple track parities to the single track parity of one track of these tracks.

For example, the parity sector management unit 630 in the idle state regularly (or discontinuously) selects a plurality of sectors (or a sector group) each being one in every two sectors (other than the error sector and the parity sector) in all sectors of the plurality of tracks, and interleaves the plurality of sectors (or the sector group) regularly (or discontinuously) selected in a particular recording region such as, for example, the disk 10, the volatile memory 70, the nonvolatile memory 80, or the buffer memory 90. The parity sector management unit 630 calculates multiple track parities by XORing a plurality of sectors (or a sector group) regularly (or discontinuously) selected in a particular recording region such as, for example, the disk 10, the volatile memory 70, the nonvolatile memory 80, or the buffer memory 90, and writes (or overwrites) (only) the calculated multiple track parities to the single track parity of one track of these tracks. The parity sector management unit 630 records the information of the track corresponding to the multiple track parities in a particular recording region, for example, the disk 10, the volatile memory 70, the nonvolatile memory 80, the buffer memory 90, or the like as a track ECC management table.

For example, the parity sector management unit 630 regularly (or discontinuously) selects a plurality of sectors (or a sector group) of the tracks arranged in an oblique direction from a plurality of sectors in every two sectors from the first sector of the outermost or innermost track among the plurality of tracks continuous in the radial direction, and interleaves the plurality of sectors (or a sector group) regularly (or discontinuously) selected in a particular recording region such as, for example, the disk 10, the volatile memory 70, the nonvolatile memory 80, or the buffer memory 90. The parity sector management unit 630 calculates multiple track parities by XORing a plurality of sectors (or a sector group) regularly (or discontinuously) selected in a particular recording region such as, for example, the disk 10, the volatile memory 70, the nonvolatile memory 80, or the buffer memory 90, and writes (or overwrites) (only) the calculated multiple track parities to the single track parity on the outermost or the innermost track. The parity sector management unit 630 records the information of the track corresponding to the multiple track parities in a particular recording region, for example, the disk 10, the volatile memory 70, the nonvolatile memory 80, the buffer memory 90, or the like as a track ECC management table.

For example, the parity sector management unit 630 regularly (or discontinuously) selects a plurality of sectors (or a sector group) of the tracks arranged in an oblique direction from a plurality of sectors in every two sectors from an adjacent sector in the traveling direction staring from the first sector of the outermost or innermost track among the plurality of tracks continuous in the radial direction, and interleaves the plurality of sectors (or a sector group) regularly (or discontinuously) selected in a particular recording region such as, for example, the disk 10, the volatile memory 70, the nonvolatile memory 80, or the buffer memory 90. The parity sector management unit 630 calculates multiple track parities by XORing a plurality of sectors (or a sector group) regularly (or discontinuously) selected in a particular recording region such as, for example, the disk 10, the volatile memory 70, the nonvolatile memory 80, or the buffer memory 90, and writes (or overwrites) (only) the calculated multiple track parities to the single track parity on the adjacent track on the outward direction or the inward direction. The parity sector management unit 630 records the information of the track corresponding to the multiple track parities in a particular recording region, for example, the disk 10, the volatile memory 70, the nonvolatile memory 80, the buffer memory 90, or the like as a track ECC management table.

For example, the parity sector management unit 630 regularly (or discontinuously) selects a plurality of sectors (or a sector group) of the tracks arranged in the radial direction from a plurality of sectors in every two sectors from the first sector of the outermost or innermost track among the plurality of tracks continuous in the radial direction, and interleaves the plurality of sectors (or a sector group) regularly (or discontinuously) selected in a particular recording region such as, for example, the disk 10, the volatile memory 70, the nonvolatile memory 80, or the buffer memory 90. The parity sector management unit 630 calculates (only) multiple track parities by XORing a plurality of sectors (or a sector group) read in a particular recording region such as, for example, the disk 10, the volatile memory 70, the nonvolatile memory 80, or the buffer memory 90, and writes (or overwrites) the calculated multiple track parities to the single track parity on the outermost or the innermost track. The parity sector management unit 630 records the information of the track corresponding to the multiple track parities in a particular recording region, for example, the disk 10, the volatile memory 70, the nonvolatile memory 80, the buffer memory 90, or the like as a track ECC management table.

For example, the parity sector management unit 630 regularly (or discontinuously) selects a plurality of sectors (or a sector group) of the tracks arranged in the radial direction from a plurality of sectors in every two sectors from an adjacent sector in the traveling direction from the first sector of the outermost or innermost track among the plurality of tracks continuous in the radial direction, and interleaves the plurality of sectors regularly (or discontinuously) selected in a particular recording region such as, for example, the disk 10, the volatile memory 70, the nonvolatile memory 80, or the buffer memory 90. The parity sector management unit 630 calculates multiple track parities by XORing a plurality of sectors (or a sector group) regularly (or discontinuously) selected in a particular recording region such as, for example, the disk 10, the volatile memory 70, the nonvolatile memory 80, or the buffer memory 90, and writes (or overwrites) the calculated multiple track parities to the single track parity on the adjacent track on the outward direction or the inward direction. The parity sector management unit 630 records the information of the track corresponding to the multiple track parities in a particular recording region, for example, the disk 10, the volatile memory 70, the nonvolatile memory 80, the buffer memory 90, or the like as a track ECC management table.

The error correction unit 640 corrects (error correction, recovery, or remediation) the error data or the error sector. The error correction unit 640 executes read retry of reading error data or an error sector a particular number of times. The error correction unit 640 executes error correction (hereinafter, may be referred to as a sector ECC or a sector ECC processing) on the error sector through ECC corresponding to the error sector of the particular track (hereinafter, may be referred to as a sector ECC). The error correction unit 640 executes error correction (track ECC or a track ECC processing) on an error sector of a particular track through ECC (track ECC) corresponding to the track. The error correction unit 640 executes the track ECC process on the error sector of the track through the track ECC based on the parity sector of the particular track.

For example, the error correction unit 640 executes the track ECC processing on an error sector that cannot be corrected by the read retry and the sector ECC processing, based on a parity sector of a particular track, to correct this error sector.

For example, the error correction unit 640 executes the track ECC (hereinafter, may be simply referred to as single track ECC or single track ECC processing) processing on an error sector that cannot be corrected by the read retry and the sector ECC processing, based on a single track parity corresponding to a particular track, to correct this error sector.

For example, the error correction unit 640 executes the track ECC (hereinafter, may be simply referred to as multiple track ECC or multiple track ECC processing) processing on an error sector that cannot be corrected by the read retry and the sector ECC processing, based on multiple track parities corresponding to a plurality of tracks, to correct this error sector.

Hereinafter, an example of a method of writing a parity sector will be described with reference to FIGS. 3 to 6.

Figure 3:
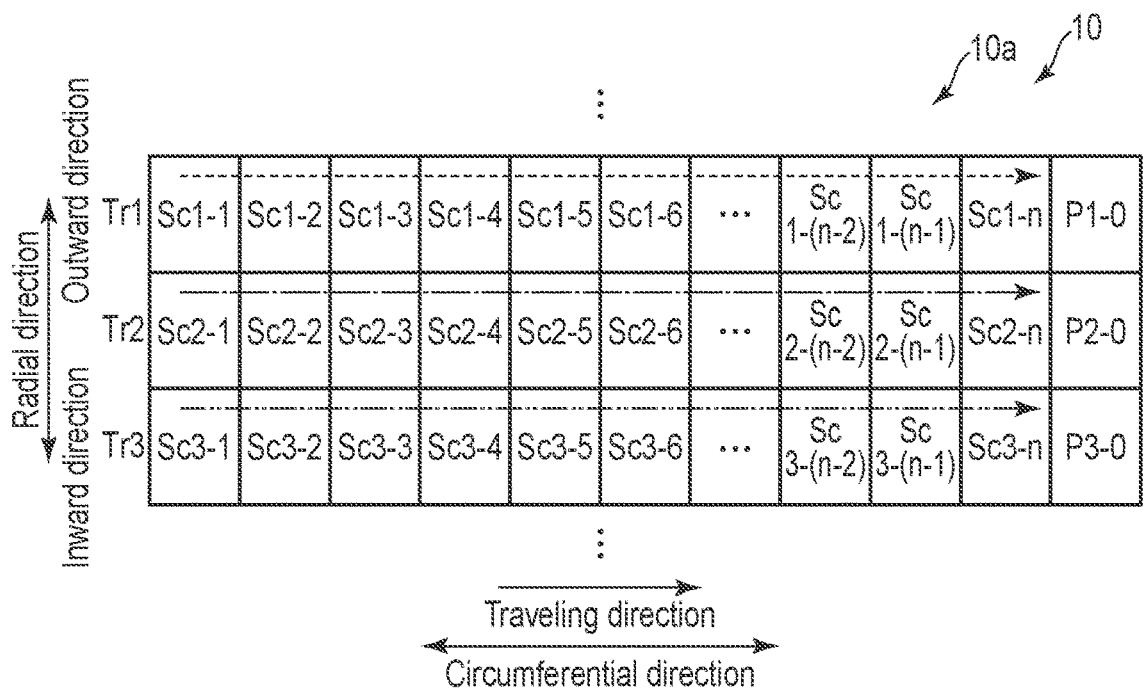
FIG. 3 is a schematic diagram illustrating an example of a write method for single track parities.

FIG. 3 is a schematic diagram illustrating an example of a write method for single track parities P1-0, P2-0, and P3-0. FIG. 3 illustrates a traveling direction. A direction in which the head 15 sequentially writes and reads data to and from the disk 10 in the circumferential direction, that is, a direction in which the head 15 travels with respect to the disk 10 in the circumferential direction may be referred to as the traveling direction. For example, the traveling direction is opposite to the rotation direction of the disk 10. The traveling direction may be the same direction as the rotation direction of the disk 10. FIG. 3 illustrates tracks Tr1, Tr2, and Tr3. Terms such as "the same", "identical", "matching", and "equivalent" include not only the meaning of being exactly the same but also the meaning of being different to such an extent that they can be regarded as being substantially the same. In FIG. 3, the tracks Tr1, Tr2, and Tr3 are continuously arranged in the described order in the inward direction. The track Tr2 is adjacent to and is on the inner side of the track Tr1. The track Tr3 is adjacent to and is on the inner side of the track Tr2. The track Tr1 includes sectors Sc1-1, Sc1-2, Sc1-3, Sc1-4, Sc1-5, Sc1-6, ..., Sc1-(n–2), Sc1-(n–1), Sc1-n, and a parity sector P1-0. In FIG. 3, the sectors Sc1-1, Sc1-2, Sc1-3, Sc1-4, Sc1-5, Sc1-6, ..., Sc1-(n–2), Sc1-(n–1), Sc1-n, and a parity sector P1-0 are continuously arranged in the described order in the traveling direction. The parity sector P1-0 corresponds to a result of XORing the sectors Sc1-1, Sc1-2, Sc1-3, Sc1-4, Sc1-5, Sc1-6, ..., Sc1-(n–2), Sc1-(n–1), and Sc1-n. The track Tr2 includes sectors Sc2-1, Sc2-2, Sc2-3, Sc2-4, Sc2-5, Sc2-6, ..., Sc2-(n–2), Sc2(n–1), Sc2-n, and a parity sector P2-0. In FIG. 3, the sectors Sc2-1, Sc2-2, Sc2-3, Sc2-4, Sc2-5, Sc2-6, ..., Sc2-(n–2), Sc2-(n–1), Sc2-n, and a parity sector P2-0 are continuously arranged in the described order in the traveling direction. The parity sector P2-0 corresponds to a result of XORing the sectors Sc2-1, Sc2-2, Sc2-3, Sc2-4, Sc2-5, Sc2-6, ..., Sc2-(n–2), Sc2-(n–1), and Sc2-n. The track Tr3 includes sectors Sc3-1, Sc3-2, Sc3-3, Sc3-4, Sc3-5, Sc3-6, ..., Sc3-(n–2), Sc3(n–1), Sc3-n, and a parity sector P3-0. In FIG. 3, the sectors Sc3-1, Sc3-2, Sc3-3, Sc3-4, Sc3-5, Sc3-6, ..., Sc3-(n–2), Sc3-(n–1), Sc3-n, and a parity sector P3-0 are continuously arranged in the described order in the traveling direction. The parity sector P3-0 corresponds to a result of XORing the sectors Sc3-1, Sc3-2, Sc3-3, Sc3-4, Sc3-5, Sc3-6, ..., Sc3-(n–2), Sc3-(n–1), and Sc3-n.

In the example illustrated in FIG. 3, when writing the track Tr1 in response to receiving a write command for writing the track Tr1 from the host 100 or the like, the MPU 60 calculates the single track parity P1-0 by XORing the sectors Sc1-1 to Sc1-n of the track Tr1 and writes the single track parity P1-0 to the sector of the track Tr1 adjacent to the sector Sc1-n in the traveling direction. The MPU 60 records the information on the track Tr1 in a form or a track ECC management table in a particular recording region such as, for example, the disk 10, the volatile memory 70, the nonvolatile memory 80, or the buffer memory 90.

In the example illustrated in FIG. 3, when writing the track Tr2 in response to receiving a write command for writing the track Tr2 from the host 100 or the like, the MPU 60 calculates the single track parity P2-0 by XORing the sectors Sc2-1 to Sc2-n of the track Tr2 and writes the single track parity P2-0 to the sector of the track Tr2 adjacent to the sector Sc2-n in the traveling direction. The MPU 60 records the information on the track Tr2 in a form or a track ECC management table in a particular recording region such as, for example, the disk 10, the volatile memory 70, the nonvolatile memory 80, or the buffer memory 90.

In the example illustrated in FIG. 3, when writing the track Tr3 in response to receiving a write command for writing the track Tr3 from the host 100 or the like, the MPU 60 calculates the single track parity P3-0 by XORing the sectors Sc3-1 to Sc3-$n$ of the track Tr3 and writes the single track parity P3-0 to the sector of the track Tr3 adjacent to the sector Sc3-$n$ in the traveling direction. The MPU 60 records the information on the track Tr3 in a form or a track ECC management table in a particular recording region such as, for example, the disk 10, the volatile memory 70, the nonvolatile memory 80, or the buffer memory 90.

Figure 4:
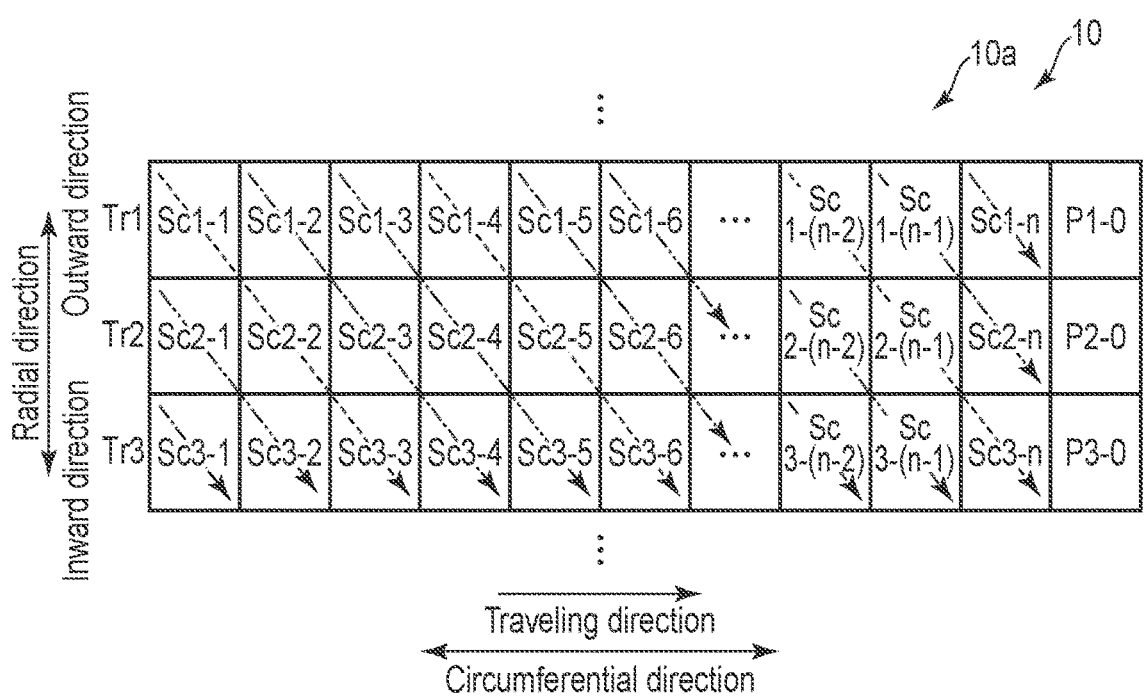
FIG. 4 is a schematic diagram illustrating an example of a method of generating a parity sector according to the embodiment.

FIG. 4 is a schematic diagram illustrating an example of a method of generating a parity sector according to the present embodiment. FIG. 4 corresponds to FIG. 3.

In the example illustrated in FIG. 4, when there is extra processing capability of the magnetic disk device 1 to spare, when there is extra time to spare, or when the magnetic disk device 1 is in the idle state for example and is not operating, for example, the MPU 60 reads the tracks Tr1, Tr2, and Tr3 corresponding to the multi-track ECC processing in the idle state. In other words, when there is extra processing capability of the magnetic disk device 1 to spare, when there is extra time to spare, or when the magnetic disk device 1 is in the idle state for example and is not operating, the MPU 60 reads the sectors Sc1-1 to Sc3-$n$ of the tracks Tr1 to Tr3 in the idle state. The MPU 60 temporarily records the read sectors Sc1-1 to Sc3-$n$ of the tracks Tr1, Tr2, and Tr3 corresponding to the multiple track ECC process in a particular recording region such as, for example, the disk 10, the volatile memory 70, the nonvolatile memory 80, or the buffer memory 90.

Figures 5, 6:
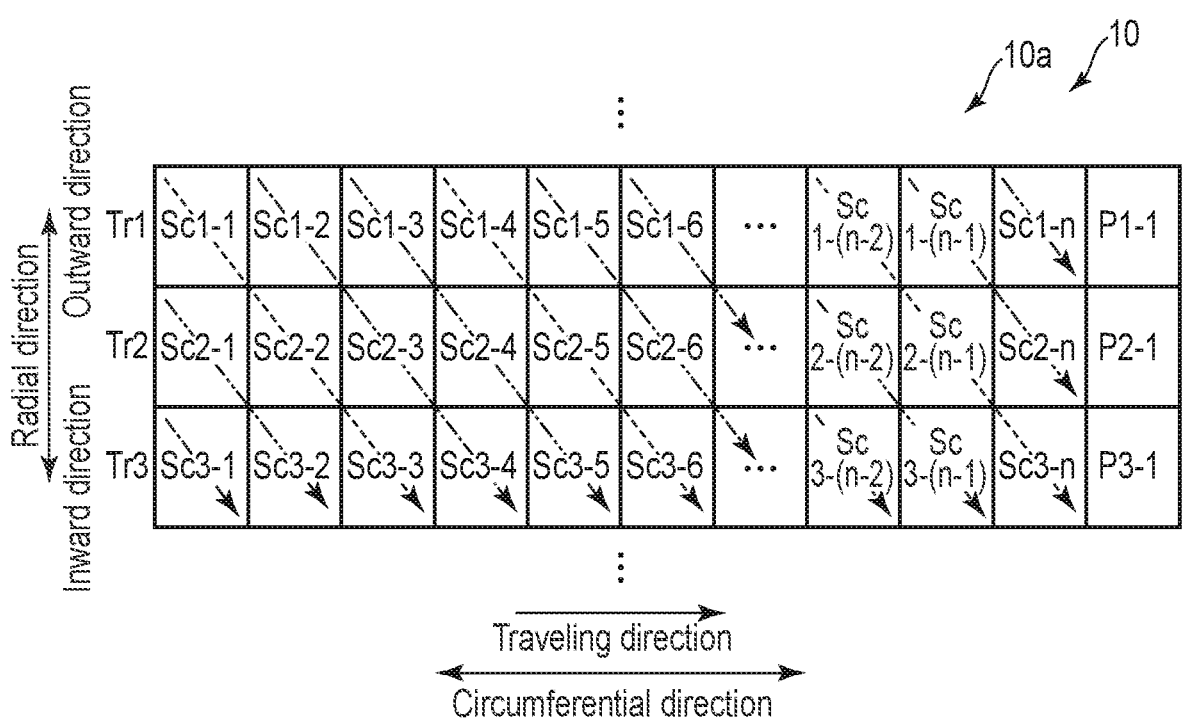
FIG. 5 is a schematic diagram illustrating an example of a method of calculating a parity sector according to the embodiment.
FIG. 6 is a schematic diagram illustrating an example of a method of writing a parity sector according to the embodiment.

FIG. 5 is a schematic diagram illustrating an example of a method of calculating a parity sector according to the present embodiment. FIG. 5 corresponds to FIG. 4.

In the example illustrated in FIG. 5, the MPU 60 selects a plurality of sectors arranged obliquely (or in a zigzag form) in the traveling direction and the inward direction from the sectors Sc1-1, Sc1-4, . . . , Sc1-($n$–2) in the disk 10 in a particular recording region such as, for example, the disk 10, the volatile memory 70, the nonvolatile memory 80, or the buffer memory 90. In a particular recording region such as, for example, the disk 10, the volatile memory 70, the nonvolatile memory 80, or the buffer memory 90, the MPU 60 interleaves the selected sectors Sc1-1, Sc2-2, Sc3-3, Sc1-4, Sc2-5, Sc3-6, . . . , Sc1-($n$–2), Sc2-($n$–1), and Sc3-$n$ in the described order. In a particular recording region, such as for example, the disk 10, the volatile memory 70, the nonvolatile memory 80, or the buffer memory 90, the MPU 60 XORs the sectors Sc1-1 to Sc3-$n$ to calculate the multiple track parity P1-1 corresponding to the track Tr1.

In the example illustrated in FIG. 5, the MPU 60 selects a plurality of sectors arranged obliquely (or in a zigzag form) in the traveling direction and the inward direction from the sectors Sc1-2, Sc1-5, . . . , Sc1-($n$–1) in the disk 10 in a particular recording region such as, for example, the disk 10, the volatile memory 70, the nonvolatile memory 80, the buffer memory 90, or the like. In a particular recording region such as, for example, the disk 10, the volatile memory 70, the nonvolatile memory 80, or the buffer memory 90, the MPU 60 interleaves the selected sectors Sc1-2, Sc2-3, Sc3-4, Sc1-5, Sc2-6, Sc3-6, . . . , Sc3-($n$–2), Sc1-($n$–1), Sc2-$n$, and Sc3-1 in the described order. In a particular recording region such as, for example, the disk 10, the volatile memory 70, the nonvolatile memory 80, or the buffer memory 90, the MPU 60 XORs the sectors Sc1-2 to Sc3-1 to calculate the multiple track parity P2-1 corresponding to the track Tr2.

In the example illustrated in FIG. 5, the MPU 60 selects a plurality of sectors arranged obliquely (or in a zigzag form) in the traveling direction and the inward direction from the sectors Sc1-3, Sc1-6, . . . , Sc1-$n$ in the disk 10 in a particular recording region such as, for example, the disk 10, the volatile memory 70, the nonvolatile memory 80, the buffer memory 90, or the like. In a particular recording region such as, for example, the disk 10, the volatile memory 70, the nonvolatile memory 80, or the buffer memory 90, the MPU 60 interleaves the selected sectors Sc1-3, Sc2-4, Sc3-5, Sc1-6, . . . , Sc2-($n$–2), Sc3-($n$–1), Sc1-$n$, Sc2-1, and Sc3-2 in the described order. In a particular recording region such as, for example, the disk 10, the volatile memory 70, the nonvolatile memory 80, or the buffer memory 90, the MPU 60 XORs the sectors Sc1-3 to Sc3-2 to calculate the multiple track parity P3-1 corresponding to the track Tr3.

FIG. 6 is a schematic diagram illustrating an example of a method of writing a parity sector according to the present embodiment. FIG. 6 corresponds to FIGS. 3, 4, and 5.

In the example illustrated in FIG. 6, the MPU 60 writes (or overwrites) the multiple track parity P1-1 illustrated in FIG. 5 to the single track parity P1-0 of the track Tr1.

In the example illustrated in FIG. 6, the MPU 60 writes (or overwrites) the multiple track parity P2-1 illustrated in FIG. 5 to the single track parity P2-0 of the track Tr2.

In the example illustrated in FIG. 6, the MPU 60 writes (or overwrites) the multiple track parity P3-1 illustrated in FIG. 5 to the single track parity P3-0 of the track Tr3.

Figure 7:
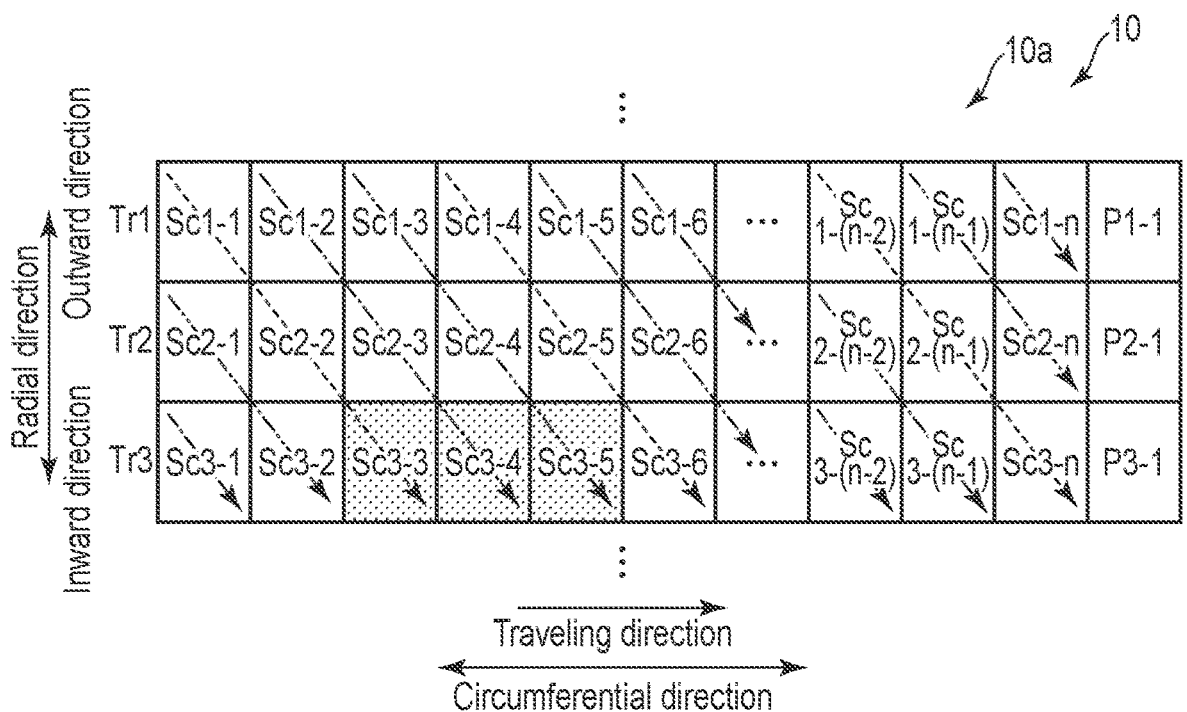
FIG. 7 is a schematic diagram illustrating an example of error correction processing according to the embodiment.

FIG. 7 is a schematic diagram illustrating an example of error correction processing according to the present embodiment. FIG. 7 corresponds to FIGS. 3 to 6. In FIG. 7, the sectors Sc3-3, Sc3-4, and Sc3-5 correspond to error sectors.

In the example illustrated in FIG. 7, the MPU 60 refers to the track ECC management table and reads the tracks Tr1, Tr2, and Tr3 corresponding to the multiple track ECC processing. The MPU 60 executes the multiple track ECC processing on the sector Sc3-3 corresponding to the multiple track parity P1-1 based on the multi-track parity P1-1, and performs error correction on the sector Sc3-3. The MPU 60 executes the multiple track ECC processing on the sector Sc3-4 corresponding to the multiple track parity P2-1 based on the multi-track parity P2-1, and performs error correction on the sector Sc3-4. The MPU 60 executes the multiple track ECC processing on the sector Sc3-5 corresponding to the multiple track parity P3-1 based on the multi-track parity P3-1, and performs error correction on the sector Sc3-5.

Figure 8:
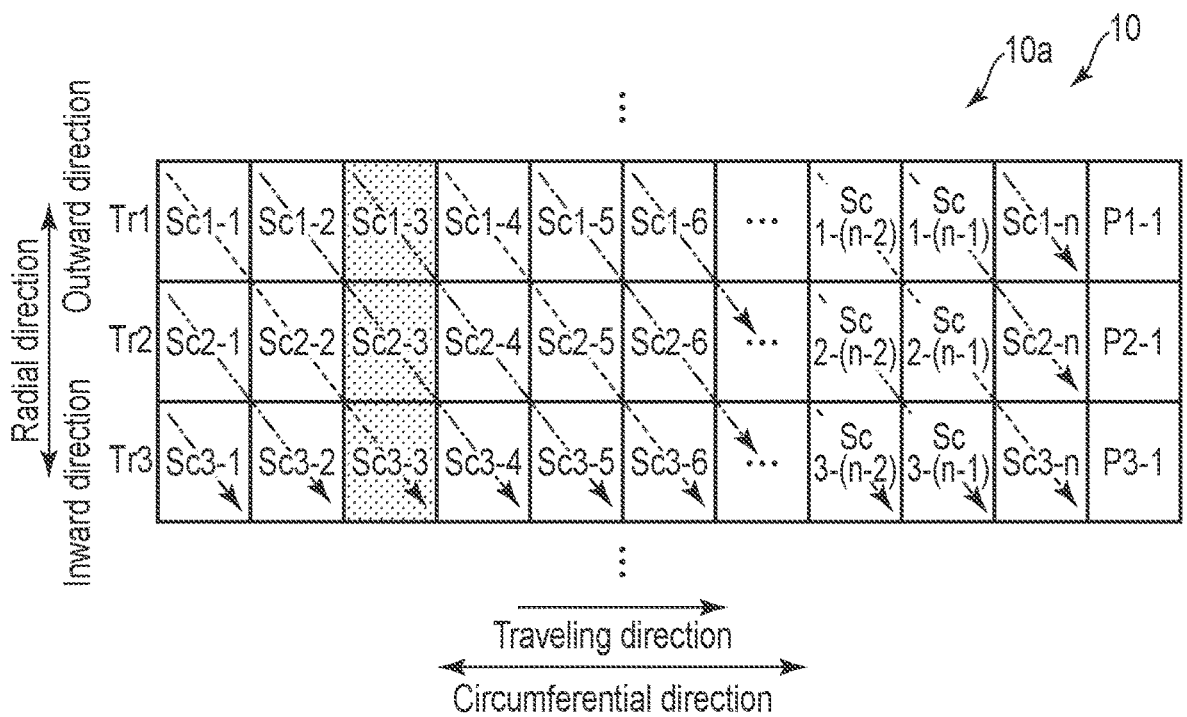
FIG. 8 is a schematic diagram illustrating an example of error correction processing according to the embodiment.

FIG. 8 is a schematic diagram illustrating an example of error correction processing according to the present embodiment. FIG. 8 corresponds to FIGS. 3 to 6. In FIG. 8, the sectors Sc1-3, Sc2-3, and Sc3-3 correspond to error sectors.

In the example illustrated in FIG. 8, the MPU 60 refers to the track ECC management table and reads the tracks Tr1, Tr2, and Tr3 corresponding to the multiple track ECC processing. The MPU 60 executes the multiple track ECC processing on the sector Sc3-3 corresponding to the multiple track parity P1-1 based on the multi-track parity P1-1, and performs error correction on the sector Sc3-3. The MPU 60 executes the multiple track ECC processing on the sector Sc2-3 corresponding to the multiple track parity P2-1 based on the multi-track parity P2-1, and performs error correction on the sector Sc2-3. The MPU 60 executes the multiple track ECC processing on the sector Sc1-3 corresponding to the multiple track parity P3-1 based on the multi-track parity P3-1, and performs error correction on the sector Sc1-3.

Figure 9:
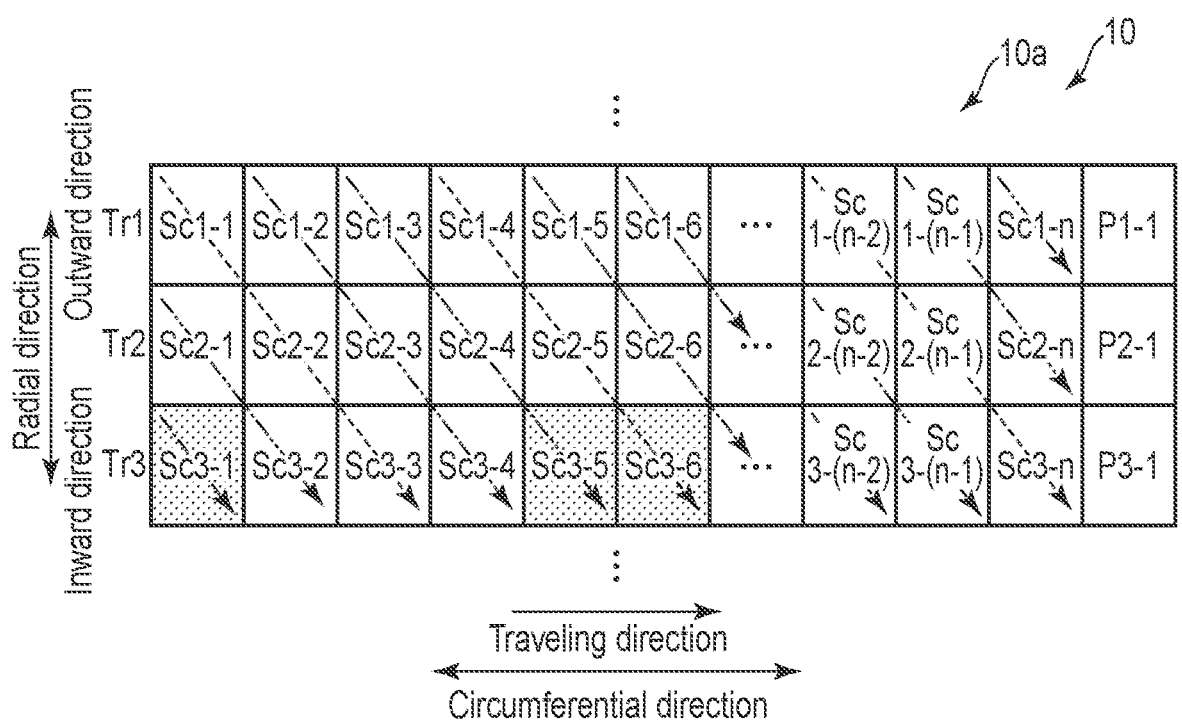
FIG. 9 is a schematic diagram illustrating an example of error correction processing according to the embodiment.

FIG. 9 is a schematic diagram illustrating an example of error correction processing according to the present embodiment. FIG. 9 corresponds to FIGS. 3 to 6. In FIG. 9, sectors Sc3-1, Sc3-5, and Sc3-6 correspond to error sectors.

In the example illustrated in FIG. 9, the MPU 60 refers to the track ECC management table and reads the tracks Tr1, Tr2, and Tr3 corresponding to the multiple track ECC processing. The MPU 60 executes the multiple track ECC processing on the sector Sc3-6 corresponding to the multiple track parity P1-1 based on the multi-track parity P1-1, and performs error correction on the sector Sc3-6. The MPU 60 executes the multiple track ECC processing on the sector Sc3-1 corresponding to the multiple track parity P2-1 based on the multi-track parity P2-1, and performs error correction on the sector Sc3-1. The MPU 60 executes the multiple track ECC processing on the sector Sc3-5 corresponding to the multiple track parity P3-1 based on the multi-track parity P3-1, and performs error correction on the sector Sc3-5.

FIG. 10 is a schematic diagram illustrating an example of a track ECC management table TB according to the present embodiment. The track ECC management table TB includes a group number, a head number, a start track number, and a target track count. The group number corresponds to a number of a particular parity sector. The head number corresponds to a head number corresponding to the parity sector with the group number. The start track number corresponds to the number of the start track corresponding to the parity sector with the group number. The target track count corresponds to the number of tracks corresponding to the parity sector with the group number.

In the example illustrated in FIG. 10, the MPU 60 calculates the single track parity with the group number 1 by XORing all sectors of the track with the start track number 3000 and the target track count 1, and records the information on the track corresponding to the calculated single track parity, for example, the group number 1, the head number 2, the start track number 3000, and the target track count 1 in the track ECC management table TB.

In the example illustrated in FIG. 10, the MPU 60 calculates the single track parity with the group number 2 by XORing all sectors of the track with the start track number 3001 and the target track count 1, and records the information on the track corresponding to the calculated single track parity, for example, the group number 2, the head number 2, the start track number 3001, and the target track count 1 in the track ECC management table TB.

In the example illustrated in FIG. 10, the MPU 60 calculates the single track parity with the group number 3 by XORing all sectors of the track with the start track number 3002 and the target track count 1, and records the information on the track corresponding to the calculated single track parity, for example, the group number 3, the head number 2, the start track number 3002, and the target track count 1 in the track ECC management table TB.

In the example illustrated in FIG. 10, the MPU 60 calculates the single track parity with the group number 4 by XORing all sectors of the track with the start track number 1333581 and the target track count 1, and records the information on the track corresponding to the calculated single track parity, for example, the group number 4, the head number 4, the start track number 1333581, and the target track count 1 in the track ECC management table TB.

In the example illustrated in FIG. 10, the MPU 60 calculates the single track parity with the group number 5 by XORing all sectors of the track with the start track number 30950 and the target track count 1, and records the information on the track corresponding to the calculated single track parity, for example, the group number 5, the head number 3, the start track number 30950, and the target track count 1 in the track ECC management table TB.

FIG. 11 is a schematic diagram illustrating an example of a track ECC management table TB according to the present embodiment. FIG. 11 corresponds to FIG. 10.

In the example illustrated in FIG. 11, the MPU 60 regularly (or discontinuously) selects all sectors of the track with the start track number 3000 and the target track count 3 using the head 15 with the head number 2, calculates a plurality of track parities with the group number 1 and the target track count 3 obtained by XORing a plurality of sectors (or a sector group) regularly (or discontinuously) selected from all the sectors of the track with the start track number 3000 and the target track count 3, and records information on tracks corresponding to the calculated multiple track parities, which is for example, the group number 1, the head number 2, the start track number 3000, and the target track count 3 in the track ECC management table TB.

FIG. 12 is a flowchart illustrating an example of a method of writing a single track parity according to the present embodiment.

The MPU 60 receives a write command (B1201). The MPU 60 provides the sector ECC to each sector of a particular track (B1202). The MPU 60 XORs all the sectors of a particular track to calculate a single track parity (B1203). The MPU 60 records the information on the track corresponding to the calculated single track parity in the track ECC management table TB, and thus updates the track ECC management table TB (B1204). The MPU 60 writes the single track parity in a particular sector of the particular track (B1205), and terminates the processing.

FIG. 13 is a flowchart illustrating an example of a method of writing a multiple track parity according to the present embodiment.

When there is extra processing capability of the magnetic disk device 1 to spare, when there is extra time to spare, or when the magnetic disk device 1 is in the idle state for example and is not operating, the MPU 60 refers to the track management table TB (B1301), reads all the sectors of a plurality of tracks corresponding to the multiple track ECC processing, and temporarily records all the read sectors in a particular recording region such as, for example, the disk 10, the volatile memory 70, the nonvolatile memory 80, the buffer memory 90, or the like (B1302). The MPU 60 interleaves a plurality of sectors regularly (or discontinuously) selected from all the sectors of a plurality of tracks corresponding to the multiple track ECC processing (B1303), and XORs the interleaved plurality of sectors to calculate a multiple track parity (B1304). The MPU 60 records the information on the track corresponding to the calculated multiple track parity in the track ECC management table TB, and thus updates the track ECC management table TB (B1305). The MPU 60 writes (or overwrites) only the calculated multiple track parity to the single track parity of one of the plurality of tracks corresponding to the multiple track ECC processing (B1306), and terminates the processing.

Figure 14:
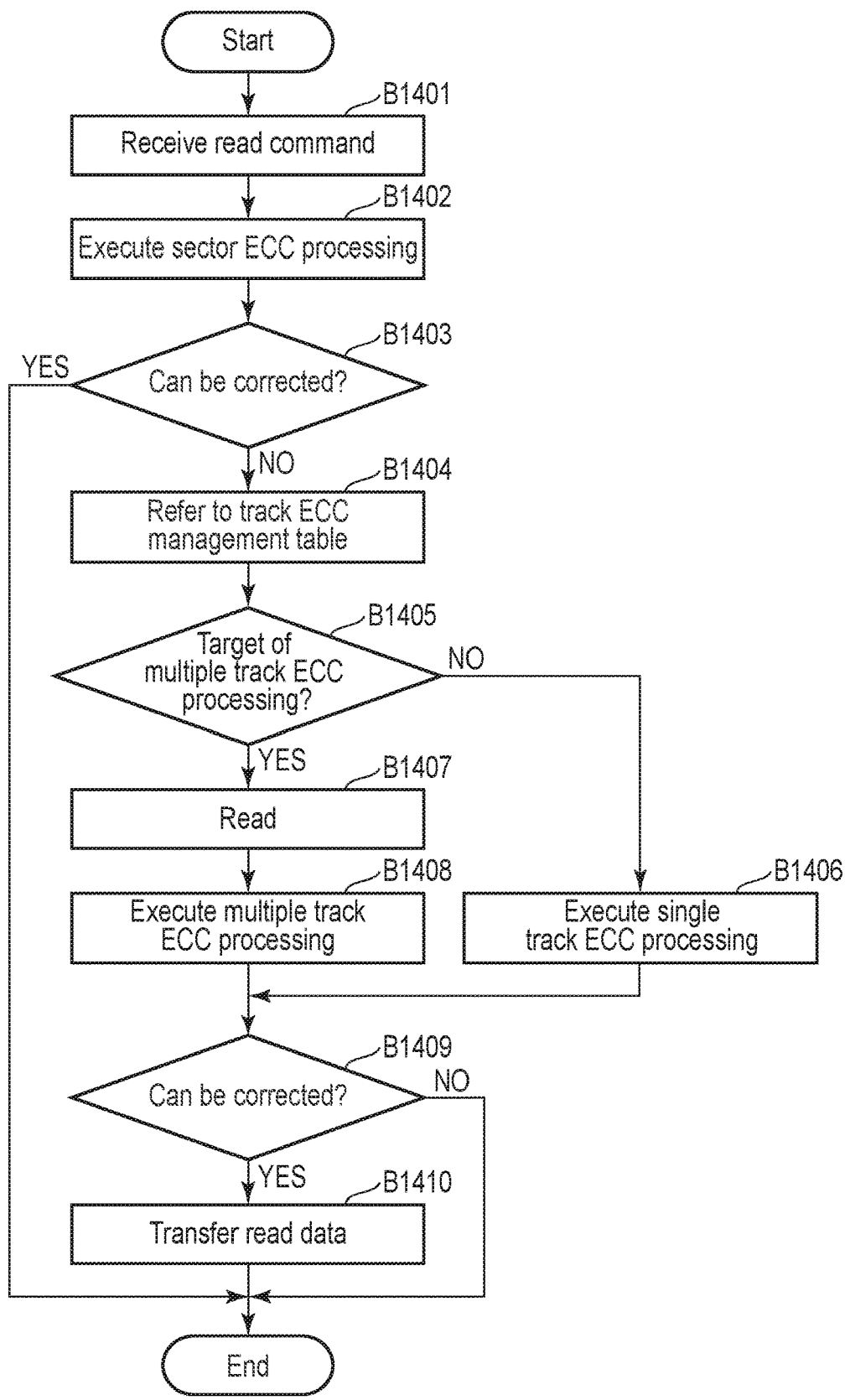
FIG. 14 is a flowchart illustrating an example of a method for read processing according to the embodiment.

FIG. 14 is a flowchart illustrating an example of a method for read processing according to the present embodiment.

The MPU 60 receives a read command from the host 100 or the like (B1401), and executes sector ECC processing on an error sector detected at the time of reading (B1402). The MPU 60 determines whether the error sector can be corrected by the sector ECC processing (B1403). When it is determined that the error sector can be corrected (YES in B1403), the MPU 60 terminates the processing. When it is determined that the error sector cannot be corrected (NO in B1403), the MPU 60 refers to the track ECC management table TB (B1404) and determines whether the error sector is a target of the multiple track ECC processing (B1405).

When it is determined that the error sector is not the target of the multiple track ECC processing (NO in B1405), the MPU 60 executes single track ECC processing on the error sector (B1406) and proceeds to the processing in B1409. When it is determined that the error sector is the target of the multiple track ECC processing (YES in B1405), the MPU 60 reads a plurality of tracks as the target of the multiple track ECC processing (B1407) and executes the multiple track ECC processing on the error sector (B1408).

The MPU 60 determines whether the error sector can be corrected by the track ECC processing (the multiple track ECC processing and the single track ECC processing) (B1409). When it is determined that the error sector cannot be corrected by the track ECC processing (NO in B1409), the MPU 60 terminates the processing. When it is determined that the error sector can be corrected by the track ECC processing, the MPU 60 transfers the read data corresponding to the error-corrected error sector to the host 100 or the like (B1410) and terminates the processing.

According to the present embodiment, when there is extra processing capability of the magnetic disk device 1 to spare, there is extra time to spare, or when the magnetic disk device 1 is in the idle state for example and is not operating, the magnetic disk device 1 refers to the track management table TB, reads all the sectors of a plurality of tracks corresponding to the multiple track ECC processing, and temporarily records all the read sectors in a particular recording region such as, for example, the disk 10, the volatile memory 70, the nonvolatile memory 80, the buffer memory 90, or the like. The magnetic disk device 1 interleaves (or performs interleave parity encoding on) a plurality of sectors regularly (or discontinuously) selected from all the sectors of a plurality of tracks corresponding to the multiple track ECC processing, and XORs the interleaved plurality of sectors to calculate a multiple track parity. The magnetic disk device 1 records the information on the track corresponding to the calculated multiple track parity in the track ECC management table TB, and thus updates the track ECC management table TB. The MPU 60 writes only the calculated multiple track parity to the single track parity of one of the plurality of tracks corresponding to the multiple track ECC processing. When there is extra processing capability of the magnetic disk device 1 to spare, there is extra time to spare, or when the magnetic disk device 1 is in the idle state for example and is not operating, the magnetic disk device 1 can write data without time loss, by calculating the parity sector. The magnetic disk device 1 executes the track ECC processing collectively on a plurality of tracks, and calculates a plurality of parity sectors corresponding to the number of tracks obtained by XORing a plurality of sectors regularly (or discontinuously) selected from all of these plurality of tracks. The magnetic disk device 1 can correct a plurality of error sectors generated in one track based on these parity sectors. Therefore, the magnetic disk device 1 can improve the read performance.

Next, a magnetic disk device according to a modification will be described. In the modifications, the same parts as those in the above-described embodiments are denoted by the same reference numerals, and the detailed description thereof will be omitted.

(First Modification)

A magnetic disk device 1 according to a first modification is different from the magnetic disk device 1 according to the above-described embodiment in the method of writing a parity sector.

Hereinafter, an example of a method of writing a parity sector will be described with reference to FIGS. 15 to 17.

Figures 15, 16:
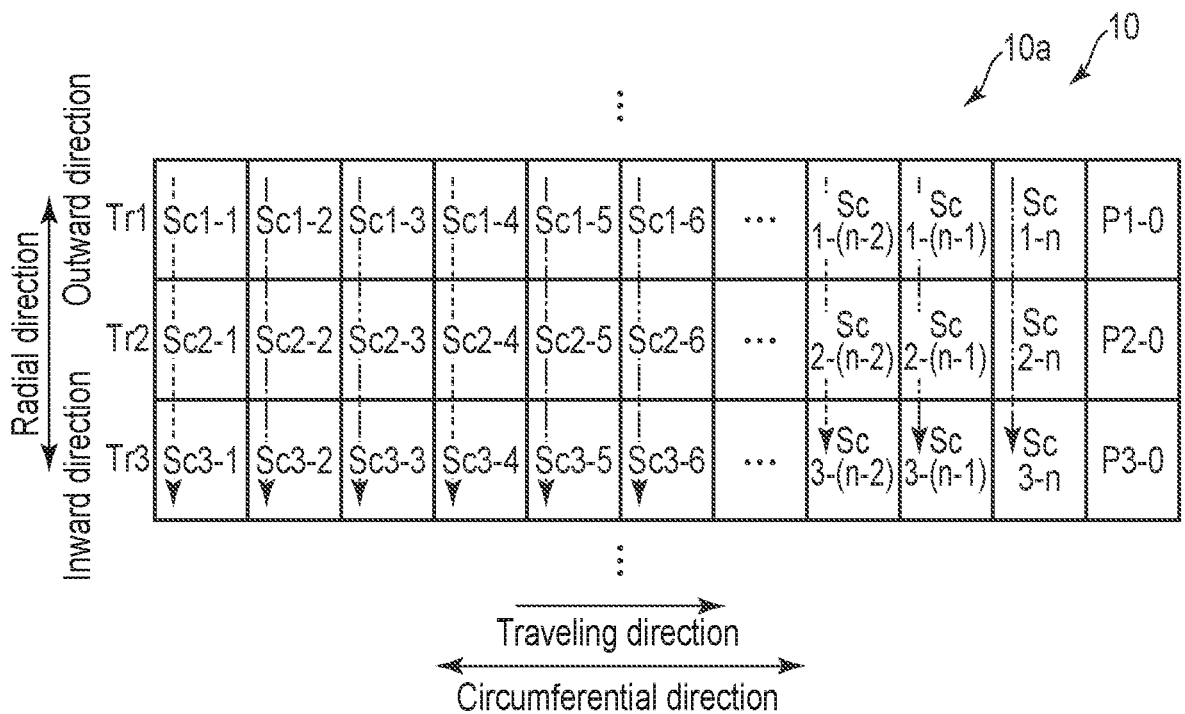
FIG. 15 is a schematic diagram illustrating an example of a method of generating a parity sector according to the embodiment.
FIG. 16 is a schematic diagram illustrating an example of a method of calculating a parity sector according to the embodiment.

FIG. 15 is a schematic diagram illustrating an example of a method of generating a parity sector according to the present embodiment. FIG. 15 corresponds to FIGS. 3 and 4.

In the example illustrated in FIG. 15, when there is extra processing capability of the magnetic disk device 1 to spare, when there is extra time to spare, or when the magnetic disk device 1 is in the idle state for example and is not operating, for example, the MPU 60 reads the tracks Tr1, Tr2, and Tr3 corresponding to the multi-track ECC processing in the idle state. In other words, when there is extra processing capability of the magnetic disk device 1 to spare, when there is extra time to spare, or when the magnetic disk device 1 is in the idle state for example and is not operating, the MPU 60 reads the sectors Sc1-1 to Sc3-$n$ of the tracks Tr1 to Tr3 in the idle state. The MPU 60 temporarily records the read sectors Sc1-1 to Sc3-$n$ of the tracks Tr1, Tr2, and Tr3 corresponding to the multiple track ECC process in a particular recording region such as, for example, the disk 10, the volatile memory 70, the nonvolatile memory 80, or the buffer memory 90.

FIG. 16 is a schematic diagram illustrating an example of a method of calculating a parity sector according to the present embodiment. FIG. 5 corresponds to FIG. 15.

In the example illustrated in FIG. 16, the MPU 60 selects a plurality of sectors arranged in the inward direction from the sectors Sc1-1, Sc1-4, . . . , Sc1-$(n-2)$ in the disk 10 in a particular recording region such as, for example, the disk 10, the volatile memory 70, the nonvolatile memory 80, the buffer memory 90, or the like. In a particular recording region such as, for example, the disk 10, the volatile memory 70, the nonvolatile memory 80, or the buffer memory 90, the MPU 60 interleaves the selected sectors Sc1-1, Sc2-1, Sc3-1, Sc1-4, Sc2-4, Sc3-4, . . . , Sc1-$(n-2)$, Sc2-$(n-2)$, and Sc3-$(n-2)$ in the described order. In a particular recording region such as for example, the disk 10, the volatile memory 70, the nonvolatile memory 80, or the buffer memory 90, the MPU 60 XORs the sectors Sc1-1 to Sc3-$(n-2)$ to calculate the multiple track parity P1-1 corresponding to the track Tr1.

In the example illustrated in FIG. 16, the MPU 60 selects a plurality of sectors arranged in the inward direction from the sectors Sc1-2, Sc1-5, . . . , Sc1-$(n-1)$ in the disk 10 in a particular recording region such as, for example, the disk 10, the volatile memory 70, the nonvolatile memory 80, the buffer memory 90, or the like. In a particular recording region such as, for example, the disk 10, the volatile memory 70, the nonvolatile memory 80, or the buffer memory 90, the MPU 60 interleaves the selected sectors Sc1-2, Sc2-2, Sc3-2, Sc1-5, Sc2-5, Sc3-5, . . . , Sc3-$(n-1)$, Sc2-$(n-1)$, and Sc3-$(n-1)$ in the described order. In a particular recording region such as, for example, the disk 10, the volatile memory 70, the nonvolatile memory 80, or the buffer memory 90, the MPU 60 XORs the sectors Sc1-2 to Sc3-$(n-1)$ to calculate the multiple track parity P2-1 corresponding to the track Tr2.

In the example illustrated in FIG. 16, the MPU 60 selects a plurality of sectors arranged in the inward direction from the sectors Sc1-3, Sc1-6, . . . , Sc1-$n$ in the disk 10 in a particular recording region such as, for example, the disk 10, the volatile memory 70, the nonvolatile memory 80, the buffer memory 90, or the like. The MPU 60 interleaves the selected sectors Sc1-3, Sc2-3, Sc3-3, Sc1-6, Sc2-6, Sc3-6, ..., Sc1-$n$, Sc2-$n$, and Sc3-$n$ in the described order in a particular recording region, for example, the disk 10, the volatile memory 70, the nonvolatile memory 80, the buffer memory 90, or the like. In a particular recording region such as, for example, the disk 10, the volatile memory 70, the nonvolatile memory 80, or the buffer memory 90, the MPU 60 XORs the sectors Sc1-3 to Sc3-$n$ to calculate the multiple track parity P3-1 corresponding to the track Tr3.

Figure 17:
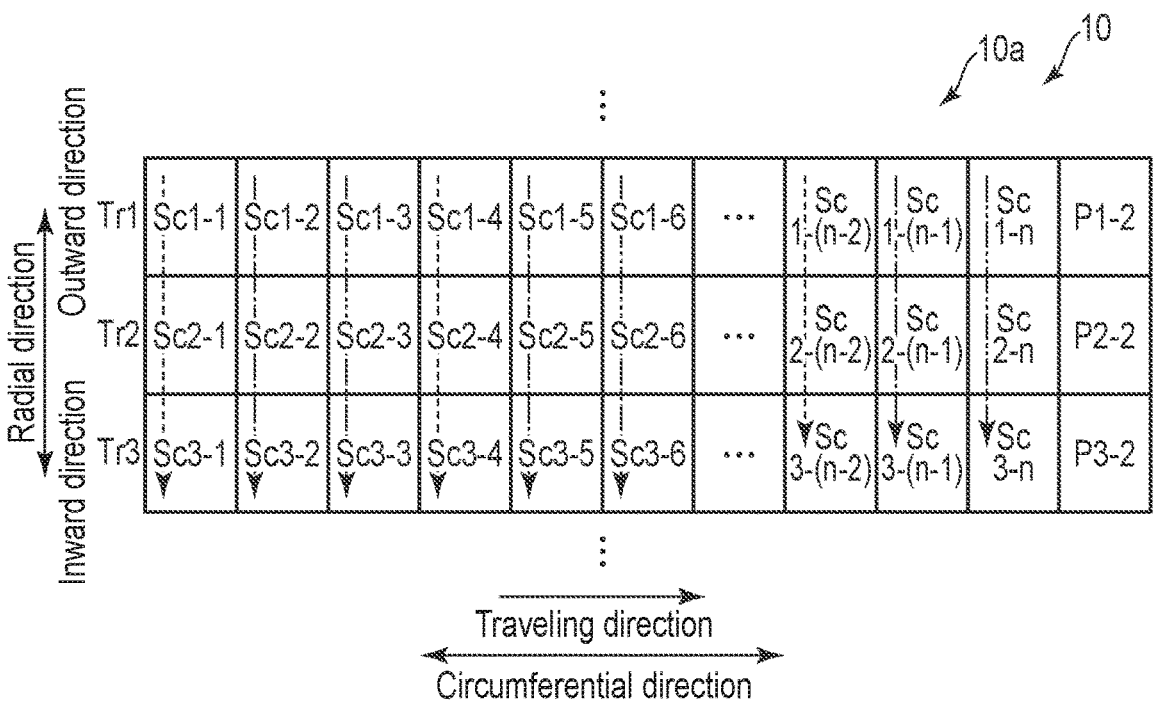
FIG. 17 is a schematic diagram illustrating an example of a method of writing a parity sector according to the embodiment.

FIG. 17 is a schematic diagram illustrating an example of a method of writing a parity sector according to the present embodiment. FIG. 17 corresponds to FIGS. 3, 15, and 16.

In the example illustrated in FIG. 17, the MPU 60 writes (or overwrites) the multiple track parity P1-2 illustrated in FIG. 16 to the single track parity P1-0 of the track Tr1.

In the example illustrated in FIG. 17, the MPU 60 writes (or overwrites) the multiple track parity P2-2 illustrated in FIG. 16 to the single track parity P2-0 of the track Tr2.

In the example illustrated in FIG. 17, the MPU 60 writes (or overwrites) the multiple track parity P3-2 illustrated in FIG. 16 to the single track parity P3-0 of the track Tr3.

Figure 18:
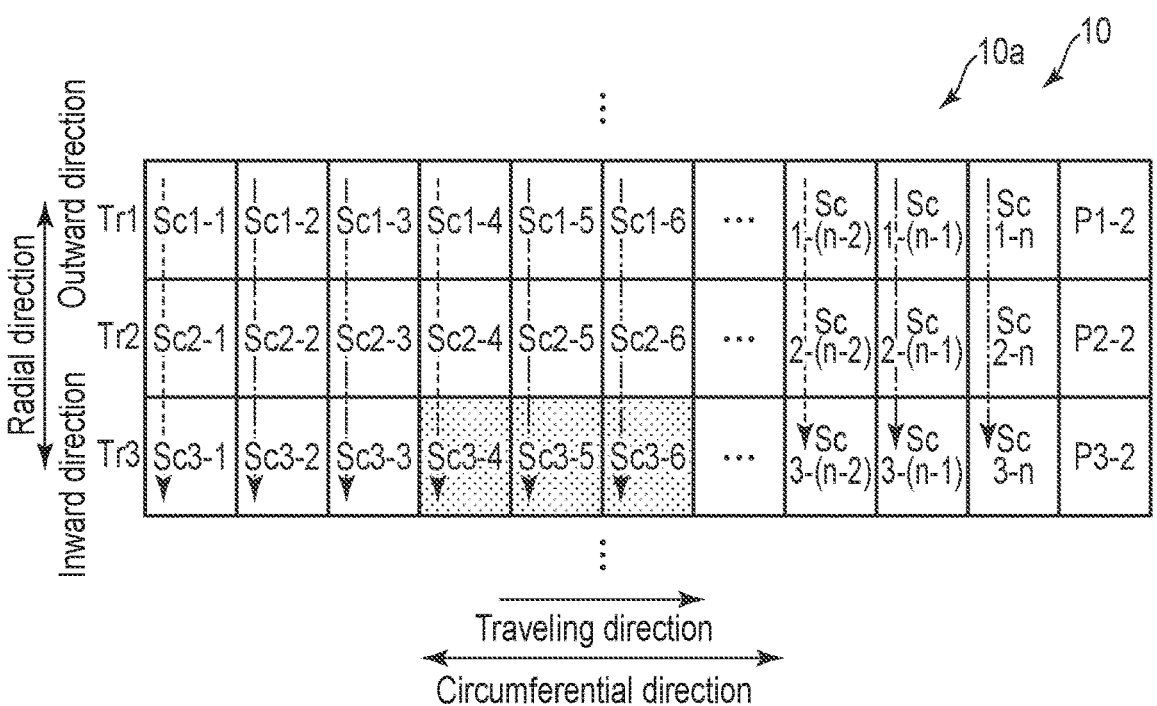
FIG. 18 is a schematic diagram illustrating an example of error correction processing according to the embodiment.

FIG. 18 is a schematic diagram illustrating an example of error correction processing according to the present embodiment. FIG. 18 corresponds to FIGS. 15 to 17. In FIG. 18, sectors Sc3-4, Sc3-5, and Sc3-6 correspond to error sectors.

In the example illustrated in FIG. 18, the MPU 60 refers to the track ECC management table and reads the tracks Tr1, Tr2, and Tr3 corresponding to the multiple track ECC processing. The MPU 60 executes the multiple track ECC processing on the sector Sc3-4 corresponding to the multiple track parity P1-2 based on the multi-track parity P1-2, and performs error correction on the sector Sc3-4. The MPU 60 executes the multiple track ECC processing on the sector Sc3-5 corresponding to the multiple track parity P2-2 based on the multi-track parity P2-2, and performs error correction on the sector Sc3-5. The MPU 60 executes the multiple track ECC processing on the sector Sc3-6 corresponding to the multiple track parity P3-2 based on the multi-track parity P3-2, and performs error correction on the sector Sc3-6.

According to the first modification, when there is extra processing capability of the magnetic disk device 1 to spare, there is extra time to spare, or when the magnetic disk device 1 is in the idle state for example and is not operating, the magnetic disk device 1 interleaves (or performs interleave parity encoding on) a plurality of sectors regularly selected from all the sectors of a plurality of tracks corresponding to the multiple track ECC processing, and XORs the interleaved plurality of sectors to calculate a multiple track parity. The magnetic disk device 1 records the information on the track corresponding to the calculated multiple track parity in the track ECC management table TB, and thus updates the track ECC management table TB. The MPU 60 writes only the calculated multiple track parity to the single track parity of one of the plurality of tracks corresponding to the multiple track ECC processing. When there is extra processing capability of the magnetic disk device 1 to spare, there is extra time to spare, or when the magnetic disk device 1 is in the idle state for example and is not operating, the magnetic disk device 1 can write data without time loss, by calculating the parity sector. The magnetic disk device 1 executes the track ECC processing collectively on a plurality of tracks, and calculates a plurality of parity sectors corresponding to the number of tracks obtained by XORing a plurality of sectors regularly (or discontinuously) selected from all of these plurality of tracks. The magnetic disk device 1 can correct a plurality of error sectors generated in one track based on these parity sectors. Therefore, the magnetic disk device 1 can improve the read performance.

An example of a magnetic disk device obtained from the configuration and the error correction method disclosed in the present specification will be noted below.

(1)

A magnetic disk device including:

a disk including a first track including a first parity sector and a second track including a second parity sector;

a head that writes data to the disk and reads data from the disk; and a controller that writes, to the first parity sector, a third parity sector obtained by XORing a first sector group included in each of the first track and the second track, and writes, to the second parity sector, a fourth parity sector obtained by XORing a second sector group different from the first sector group, included in each of the first track and the second track.

(2)

The magnetic disk device according to (1), wherein the controller, during an idle state, calculates the third parity sector and the fourth parity sector, writes the third parity sector to the first parity sector, and writes the fourth parity sector to the second parity sector.

(3)

The magnetic disk device according to (1) or (2), wherein the controller performs reading from the first track and the second track, selects the first sector group arranged in every several sectors from a first sector, which comes first, of the first track in all sectors other than the first parity sector and the second parity sector in the first track and the second track, interleaves the first sector group, XORs the interleaved first sector group to calculate the third parity sector, selects the second sector group arranged in every several sectors from a second sector, adjacent to the first sector in a circumferential direction of the disk, of the first track in all sectors other than the first parity sector and the second parity sector in the first track and the second track, interleaves the second sector group, and XORs the interleaved second sector group to calculate the fourth parity sector.

(4)

The magnetic disk device according to (1) or (2), wherein the controller performs reading from the first track and the second track, selects the first sector group in a zigzag manner from all sectors other than the first parity sector and the second parity sector in the first track and the second track, interleaves the first sector group, XORs the interleaved first sector group to calculate the third parity sector, selects the second sector group in a zigzag manner from all sectors other than the first parity sector and the second parity sector in the first track and the second track, interleaves the first sector group, and XORs the interleaved first sector group to calculate the third parity sector.

(5)

The magnetic disk device according to any one of (1) to (4), wherein the controller records in a table, information on the first track and the second track corresponding to the third parity sector and the fourth parity sector.

(6)

The magnetic disk device according to any one of (1) to (5), wherein the controller performs error correction on an error sector of the second track based on the third parity sector.

(7)

The magnetic disk device according to any one of (1) to (5), wherein the controller performs error correction on an error sector of the first track based on the fourth parity sector.

(8)

The magnetic disk device according to any one of (1) to (5), wherein the controller performs error correction on a first error sector of the second track based on the third parity sector, and performs error correction on a second error sector adjacent to the first error sector of the second track based on the fourth parity sector.

(9)

The magnetic disk device according to any one of (1) to (8), wherein upon receiving a write command, the controller performs writing on the first track to the disk, writes the first parity sector calculated by XORing all sectors of the first track to the first track, performs writing on the second track to the disk, and writes the second parity sector calculated by XORing all sectors of the second track to the second track.

(10)

An error correction processing method applied to a magnetic disk device including a disk including a first track including a first parity sector and a second track including a second parity sector, and a head that writes data to the disk and reads data from the disk, the error correction processing method including:

writing, to the first parity sector, a third parity sector obtained by XORing a first sector group included in each of the first track and the second track; and writing, to the second parity sector, a fourth parity sector obtained by XORing a second sector group different from the first sector group, included in each of the first track and the second track.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a disk including a first track including a first parity sector and a second track including a second parity sector;
   a head that writes data to the disk and reads data from the disk; and
   a controller that writes, to the first parity sector, a third parity sector obtained by XORing a first sector group included in each of the first track and the second track, and writes, to the second parity sector, a fourth parity sector obtained by XORing a second sector group different from the first sector group, included in each of the first track and the second track.

2. The magnetic disk device according to claim 1, wherein the controller, during an idle state, calculates the third parity sector and the fourth parity sector, writes the third parity sector to the first parity sector, and writes the fourth parity sector to the second parity sector.

3. The magnetic disk device according to claim 1, wherein the controller performs reading from the first track and the second track, selects the first sector group arranged in every several sectors from a first sector, which comes first, of the first track in all sectors other than the first parity sector and the second parity sector in the first track and the second track, interleaves the first sector group, XORs the interleaved first sector group to calculate the third parity sector, selects the second sector group arranged in every several sectors from a second sector, adjacent to the first sector in a circumferential direction of the disk, of the first track in all sectors other than the first parity sector and the second parity sector in the first track and the second track, interleaves the second sector group, and XORs the interleaved second sector group to calculate the fourth parity sector.

4. The magnetic disk device according to claim 1, wherein the controller performs reading from the first track and the second track, selects the first sector group in a zigzag manner from all sectors other than the first parity sector and the second parity sector in the first track and the second track, interleaves the first sector group, XORs the interleaved first sector group to calculate the third parity sector, selects the second sector group in a zigzag manner from all sectors other than the first parity sector and the second parity sector in the first track and the second track, interleaves the second sector group, and XORs the interleaved second sector group to calculate the fourth parity sector.

5. The magnetic disk device according to claim 1, wherein the controller records in a table, information on the first track and the second track corresponding to the third parity sector and the fourth parity sector.

6. The magnetic disk device according to claim 1, wherein the controller performs error correction on an error sector of the second track based on the third parity sector.

7. The magnetic disk device according to claim 1, wherein the controller performs error correction on an error sector of the first track based on the fourth parity sector.

8. The magnetic disk device according to claim 1, wherein the controller performs error correction on a first error sector of the second track based on the third parity sector, and performs error correction on a second error sector adjacent to the first error sector of the second track based on the fourth parity sector.

9. The magnetic disk device according to claim 1, wherein upon receiving a write command, the controller performs writing on the first track of the disk, writes the first parity sector calculated by XORing all sectors of the first track to the first track, performs writing on the second track of the disk, and writes the second parity sector calculated by XORing all sectors of the second track to the second track.

10. The magnetic disk device according to claim 5, wherein information on the first track and the second track includes a head number corresponding to the first track and the second track, as well as a track number and a track count corresponding to the third parity sector and the fourth parity sector.

11. An error correction processing method applied to a magnetic disk device comprising a disk including a first track including a first parity sector and a second track including a second parity sector, and a head that writes data to the disk and reads data from the disk, the error correction processing method comprising:

writing, to the first parity sector, a third parity sector obtained by XORing a first sector group included in each of the first track and the second track; and writing, to the second parity sector, a fourth parity sector obtained by XORing a second sector group different from the first sector group, included in each of the first track and the second track.

12. The error correction processing method according to claim 11, further comprising:

during an idle state, calculating the third parity sector and the fourth parity sector;

writing the third parity sector to the first parity sector; and writing the fourth parity sector to the second parity sector.

13. The error correction processing method according to claim 11, further comprising:
   reading from the first track and the second track;
   selecting the first sector group arranged in every several sectors from a first sector, which comes first, of the first track in all sectors other than the first parity sector and the second parity sector in the first track and the second track;
   interleaving the first sector group;
   XORing the interleaved first sector group to calculate the third parity sector;
   selecting the second sector group arranged in every several sectors from a second sector, adjacent to the first sector in a circumferential direction of the disk, of the first track in all sectors other than the first parity sector and the second parity sector in the first track and the second track;
   interleaving the second sector group; and
   XORing the interleaved second sector group to calculate the fourth parity sector.

14. The error correction processing method according to claim 11, further comprising:
   reading from the first track and the second track;
   selecting the first sector group in a zigzag manner from all sectors other than the first parity sector and the second parity sector in the first track and the second track;
   interleaving the first sector group;
   XORing the interleaved first sector group to calculate the third parity sector;
   selecting the second sector group in a zigzag manner from all sectors other than the first parity sector and the second parity sector in the first track and the second track;
   interleaving the second sector group; and
   XORing the interleaved second sector group to calculate the fourth parity sector.

15. The error correction processing method according to claim 11, further comprising:
   recording in a table, information on the first track and the second track corresponding to the third parity sector and the fourth parity sector.

16. The error correction processing method according to claim 11, further comprising:
   performing error correction on an error sector of the second track based on the third parity sector.

17. The error correction processing method according to claim 11, further comprising:
   performing error correction on an error sector of the first track based on the fourth parity sector.

18. The error correction processing method according to claim 11, further comprising:
   performing error correction on a first error sector of the second track based on the third parity sector; and
   performing error correction on a second error sector adjacent to the first error sector of the second track based on the fourth parity sector.

19. The error correction processing method according to claim 11, further comprising:
   upon receiving a write command, writing on the first track of the disk;
   writing the first parity sector calculated by XORing all sectors of the first track to the first track;
   writing on the second track of the disk; and
   writing the second parity sector calculated by XORing all sectors of the second track to the second track.

20. The error correction processing method according to claim 15, wherein information on the first track and the second track includes a head number corresponding to the first track and the second track, as well as a track number and a track count corresponding to the third parity sector and the fourth parity sector.

* * * * *